(12) United States Patent
Hofmann et al.

(10) Patent No.: US 11,506,145 B2
(45) Date of Patent: Nov. 22, 2022

(54) EXHAUST DIFFUSER HUB STRUCTURE FOR REDUCING FLOW SEPARATION

(71) Applicant: DOOSAN ENERBILITY CO., LTD, Changwon (KR)

(72) Inventors: Willy Hofmann, Zelgweg (CH); Ik Sang Lee, Seoul (KR)

(*) Notice: Subject to any disclaimer, the term of this patent is extended or adjusted under 35 U.S.C. 154(b) by 0 days.

(21) Appl. No.: 17/200,915

(22) Filed: Mar. 15, 2021

(65) Prior Publication Data
US 2021/0293204 A1 Sep. 23, 2021

(30) Foreign Application Priority Data
Mar. 20, 2020 (KR) .......... 10-2020-0034267

(51) Int. Cl.
*F01D 25/30* (2006.01)
*F02K 1/78* (2006.01)
*F15D 1/04* (2006.01)

(52) U.S. Cl.
CPC ............ *F02K 1/78* (2013.01); *F01D 25/30* (2013.01); *F15D 1/04* (2013.01); *F05D 2240/12* (2013.01)

(58) Field of Classification Search
CPC .................................. F01D 25/30; F15D 1/04
See application file for complete search history.

(56) References Cited

U.S. PATENT DOCUMENTS

| 4,802,821 | A | * | 2/1989 | Krietmeier | F01D 25/30 |
| | | | | | 415/914 |
| 5,791,136 | A | * | 8/1998 | Utamura | F01D 5/145 |
| | | | | | 60/39.182 |
| 9,109,466 | B2 | | 8/2015 | Lo et al. | |
| 2005/0098685 | A1 | * | 5/2005 | Segota | F15D 1/12 |
| | | | | | 244/130 |
| 2010/0021291 | A1 | * | 1/2010 | Beeck | F01D 5/143 |
| | | | | | 415/207 |
| 2013/0081731 | A1 | | 4/2013 | Nanda | |
| 2013/0129498 | A1 | * | 5/2013 | Hofmann | F01D 9/02 |
| | | | | | 415/211.2 |
| 2013/0170972 | A1 | * | 7/2013 | Broeker | F01D 5/145 |
| | | | | | 415/207 |
| 2016/0245119 | A1 | * | 8/2016 | Wilkins | F01D 25/30 |

FOREIGN PATENT DOCUMENTS

| EP | 2594741 | A2 | | 5/2013 |
| JP | 04126546 | A | | 4/1992 |
| JP | 2002364310 | A | | 12/2002 |
| JP | 3601958 | B2 | | 12/2004 |
| JP | 2005240681 | A | * | 9/2005 |
| JP | 2005240681 | A | | 9/2005 |
| JP | 2011529551 | A | | 12/2011 |
| JP | 2013108498 | A | | 6/2013 |
| KR | 1020170135754 | A | | 12/2017 |

OTHER PUBLICATIONS

European Patent Office Search report dated Aug. 12, 2021.

* cited by examiner

*Primary Examiner* — Todd E Manahan
*Assistant Examiner* — Marc J Amar
(74) *Attorney, Agent, or Firm* — Harvest IP Law, LLP (57) ABSTRACT

An exhaust diffuser hub disposed at a longitudinal center of an exhaust diffuser is provided. The exhaust diffuser hub includes a hub extension extending from a downstream end thereof in a longitudinal direction of the exhaust diffuser. A transverse cross-sectional area of the hub extension is smaller than a transverse cross-sectional area of the hub.

16 Claims, 8 Drawing Sheets

Related Art

FIG. 8 ent, there is provided an exhaust diffuser hub disposed at a longitudinal center of an exhaust diffuser, the hub including: a hub extension extending from a downstream end thereof in a longitudinal direction of the exhaust diffuser. A transverse cross-sectional area of the hub extension may be smaller than a transverse cross-sectional area of the hub.
EXHAUST DIFFUSER HUB STRUCTURE FOR REDUCING FLOW SEPARATION

CROSS REFERENCE TO RELATED APPLICATION

This application claims priority to Korean Patent Application No. 10-2020-0034267, filed on Mar. 20, 2020, the disclosure of which is incorporated herein by reference in its entirety.

FIELD

Apparatuses and methods consistent with exemplary embodiments relate to an exhaust diffuser hub structure and, more particularly, to an exhaust diffuser hub structure configured to reduce pressure loss and flow separation starting from one end of a hub located at a longitudinal center of an exhaust diffuser, thereby reducing pressure loss in the exhaust diffuser.

BACKGROUND

A gas turbine includes a compressor, a combustor, and a turbine. The compressor compresses air by a plurality of compressor blades to generate compressed air which is in a high-temperature and high-pressure state. The combustor mixes the compressed air supplied from the compressor with fuel and burns a mixture thereof by a burner to generate high-temperature and high-pressure combustion gas which is discharged to the turbine. The turbine includes a plurality of turbine blades rotated by the combustion gas, thereby generating power. The generated power is used in various fields, such as power generation and machine driving. For example, the gas turbine is used for driving a power generator, an aircraft, a locomotive, or the like.

After rotating the turbine blades, the combustion gas may be exhausted to outside through an exhaust diffuser located on the turbine. However, in order to form an annular exhaust space of the exhaust diffuser, a conical hub and a conical casing located concentric with and outside the conical hub are necessary, and a strut connecting and supporting the conical hub and the conical casing is radially provided.

While a diameter of the conical hub located at a longitudinal center of the exhaust diffuser is substantially constant, a diameter of the conical casing gradually increases in a downstream direction. Thus, at a distal end at which the conical hub terminates, there is a sudden expansion in a flow space. Due to this sudden expansion section of the flow space, a sudden change in pressure occurs in a flow of combustion gas, thereby causing a loss. A portion of the flow drawn into the end of the conical hub is not properly joined, thereby forming a long flow separation section at a rear of the conical hub.

Pressure loss and flow separation occurring inside the exhaust diffuser may lower the efficiency of exhaust and have an adverse effect on the overall efficiency of a composite power generation system provided by connecting a heat recovery system generator (HRSG) and a steam turbine with respect to a gas turbine.

BRIEF DESCRIPTION

Aspects of one or more exemplary embodiments provide an exhaust diffuser hub structure configured to reduce pressure loss and flow separation starting from one end of the hub located at a longitudinal center of an exhaust diffuser, thereby reducing pressure loss inside the exhaust diffuser.

According to an aspect of an exemplary embodiment, there is provided an exhaust diffuser hub disposed at a longitudinal center of an exhaust diffuser, the hub including: a hub extension extending from a downstream end thereof in a longitudinal direction of the exhaust diffuser. A transverse cross-sectional area of the hub extension may be smaller than a transverse cross-sectional area of the hub.

The hub extension may be concentric with the hub and form a stepped portion with respect to the hub, the stepped portion extending along a circumference of the hub extension.

The hub extension may be cylindrical.

The cylindrical hub may be hollow and one end thereof may be exposed.

The exhaust diffuser hub may further include at least one guide provided on side surface portions of the hub extension.

A height of the at least one guide may correspond to a height of the stepped portion formed by the hub extension with respect to the hub.

A length of the at least one guide may correspond to a length of the hub extension.

The at least one guide may have a quadrangular shape.

The at least one guide may be a plurality of guides, and angles between the plurality of guides may be equal.

The at least one guide may include a plurality of guides extending into the hub extension and intersecting with each other.

According to an aspect of another exemplary embodiment, there is provided an exhaust diffuser including: a cylindrical hub; a conical casing disposed outside and concentric with the cylindrical hub; and a strut configured to connect and support the cylindrical hub and the conical casing. The hub may include a hub extension extending from a downstream end thereof in a longitudinal direction of the exhaust diffuser. A transverse cross-sectional area of the hub extension may be smaller than a transverse cross-sectional area of the hub.

The exhaust diffuser hub according to the exemplary embodiments includes the hub extension of which diameter is smaller than that of the hub. This configuration may reduce and delay pressure loss and flow separation occurring in a sudden expansion section of the exhaust diffuser, thereby improving the efficiency of exhaust of the exhaust diffuser.

BRIEF DESCRIPTION OF THE DRAWINGS

The above and other aspects will be more apparent from the following description of the exemplary embodiments with reference to the accompanying drawings, in which.

DETAILED DESCRIPTION

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. When terms such as "on" and "over" are used herein to refer to layers, areas, patterns, or structures, it should be understood that a layer, area, pattern, or structure may be located above another layer, area, pattern, or structure directly or indirectly via an intervening layer, area, pattern, or structure. When terms such as "under" and "below" are used herein to refer to layers, areas, patterns, or structures, it should be understood that a layer, area, pattern, or structure may be located below another layer, area, pattern, or structure directly or indirectly via an intervening layer, area, pattern, or structure. In the disclosure, terms such as "includes," "comprises," and "have/has" should be construed as designating that there are such features, integers, steps, operations, elements, components, and/or combinations thereof, not to exclude the presence or possibility of adding of one or more of other features, integers, steps, operations, elements, components, and/or combinations thereof.

In addition, unless otherwise specified herein, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, exemplary embodiments will be described in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 1:
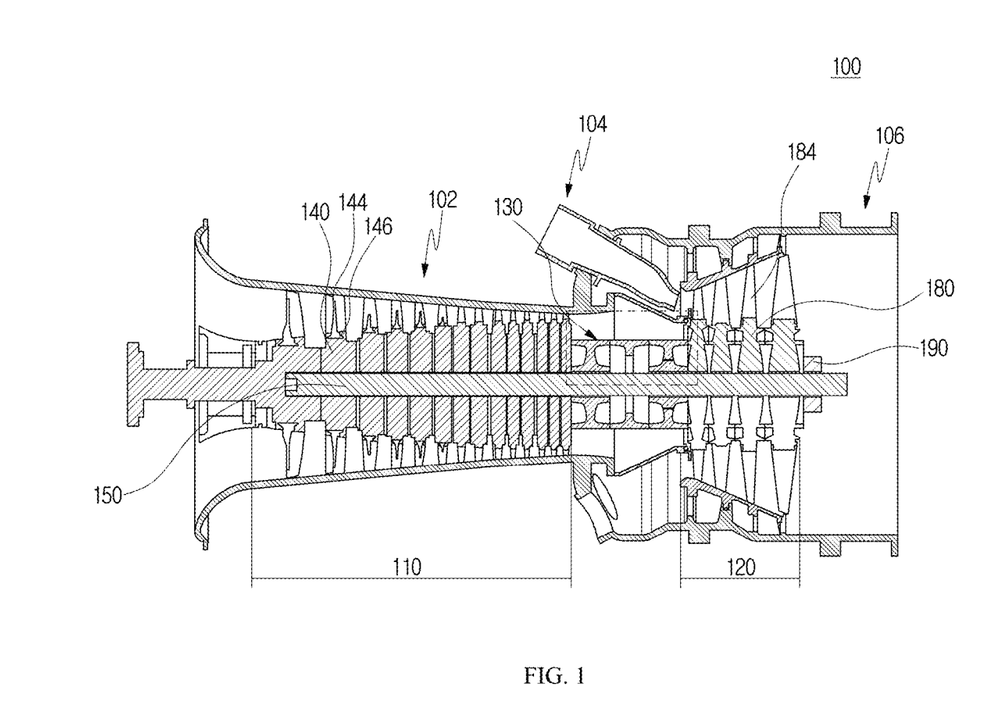
FIG. 1 is a view illustrating an example of a gas turbine to which an exhaust diffuser according to an exemplary embodiment is applied.

FIG. 1 is a cross-sectional view illustrating a gas turbine according to an exemplary embodiment. Referring to FIG. 1, a gas turbine 100 according to an exemplary embodiment includes a compressor 110, a combustor 104, a turbine 120, a housing 102, and an exhaust diffuser 106.

The housing 102 covers the compressor 110 which compresses an introduced air at high pressure and delivers the compressed gas to the combustor 104. The combustor 104 generates high-temperature and high-pressure combustion gas using a mixture of the compressed air and fuel and supplies the combustion gas to the turbine 120. The turbine 120 generates rotational torque using the combustion gas supplied from the combustor 104. The exhaust diffuser 106 is located at a rear of the turbine 120 to broaden (or expand) the high temperature combustion gas and reduce the speed thereof. The gas turbine 100 further includes a torque tube 130 between the compressor 110 and the turbine 120 in order to transfer the rotational torque generated by the turbine 120 to the compressor 110.

The compressor 110 includes a plurality of compressor blades 144 radially arranged on a plurality of compressor rotor disks 140. Each of the plurality of compressor blades 144 includes a compressor blade root 146 having a shape of a dovetail or a fir tree and configured to be coupled to a corresponding one of the compressor rotor disks 140. The compressor 110 rotates the plurality of compressor blades 144, and air is compressed and moved to the combustor 104. Here, the compressor 110 is directly or indirectly connected to the turbine 120 to receive a portion of power generated by the turbine 120. The received power is used to rotate the plurality of compressor blades 144.

Air compressed by the compressor 110 is moved to the combustor 104. The combustor 104 includes a plurality of casings and a plurality of combustors arranged in a circular pattern. The combustor 104 includes a combustion chamber including a liner. Fuel provided through a fuel nozzle is supplied to the combustion chamber of the combustor 104. The combustor 104 mixes the compressed air with the fuel and burns the mixture in the combustion chamber to generate high-temperature and high-pressure combustion gas which is discharged to the turbine 120, thereby rotating turbine blades 184 attached to turbine rotor disks 180.

The gas turbine 100 further includes a tie rod 150 extending through the turbine rotor disks 180 and the compressor rotor disks 140. One end of the tie rod 150 is attached to the compressor rotor disk 140 that is disposed at the most upstream side, and the other end thereof is fixed by a fixing nut 190. Here, adjacent compressor rotor disks 140 are arranged so that facing surfaces thereof are in tight contact with each other by the tie rod 150, thereby preventing the adjacent compressor rotor disks from rotating separately. A plurality of compressor vanes are fixedly arranged between each of the compressor rotor disks 140. While the compressor rotor disks 140 rotate along with a rotation of the tie rod 150, vanes attached to the housing 102 do not rotate. The compressor vanes guide the flow of compressed air moved from front-stage compressor blades 144 of the compressor rotor disk 140 to rear-stage compressor blades 144 of the compressor rotor disk 140.

The turbine 120 basically has a structure similar to that of the compressor 110. That is, the turbine 120 includes the plurality of turbine rotor disks 180 and a plurality of turbine blades 184 coupled to the turbine rotor disks 180 similar to the compressor rotor disks 140 of the compressor 110. Each turbine rotor disk 180 includes the plurality of turbine blades 184 which are radially disposed on the turbine rotor disks 180. The plurality of turbine blades 184 may be connected to the turbine rotor disks 180 via a dovetail joint or a fir joint. In addition, turbine vanes fixed to the housing are provided between the turbine blades 184 of the turbine rotor disk 180 to guide a flow direction of combustion gas passing through the turbine blades 184.

The high temperature combustion gas passes through the turbine 120 along the axial direction and rotates the turbine blades 184. For example, after rotating the turbine blades 184, the combustion gas may be exhausted to outside through the exhaust diffuser 106 located at the rear of the turbine 120. That is, the exhaust diffuser 106 receives the exhaust gas from the turbine 120 and discharges the exhaust gas from the gas turbine 100. Here, the combustion gas exhausted through the exhaust diffuser 106 is also referred to as exhaust gas.

Figure 2:
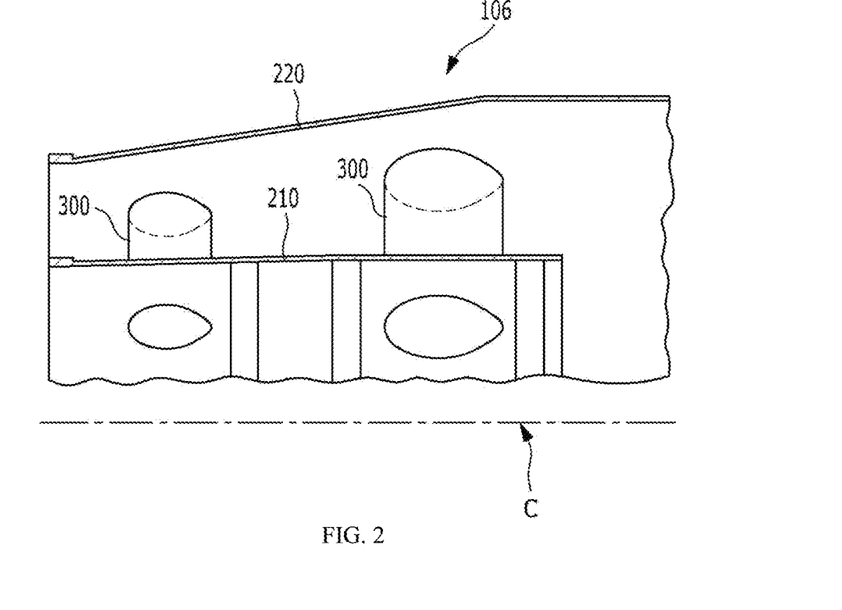
FIG. 2 is a view schematically illustrating a structure of the exhaust diffuser according to an exemplary embodiment.

FIG. 2 is a view schematically illustrating a structure of the exhaust diffuser 106 located at the rear of the turbine 120 according to an exemplary embodiment. Referring to FIG. 2, the exhaust diffuser 106 is configured such that a cylindrical hub 210 located inside and a conical casing 220 located outside are arranged concentrically, thereby forming an annular space through which combustion gas is exhausted. The hub 210 is located at a longitudinal center C of the exhaust diffuser 106. The conical casing 220 is large in size, has a long length extending backward, and has a thin thickness. Because vibration may be caused by a flow of combustion gas, the structural durability of the conical casing is not durable. For this reason, the casing 220 has a support structure in which the casing 220 is connected to and supported by a strut 300 with respect to the cylindrical hub 210. Because the strut 300 intersects a path through which the combustion gas flows, the strut 300 has an airfoil-shaped cross-section to minimize the flow of the combustion gas.

Figure 3:
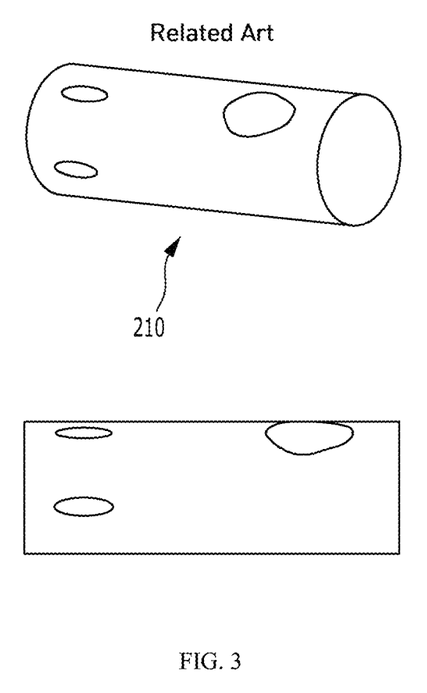
FIG. 3 is a view illustrating a structure of a hub of the related art.

FIG. 3 is a view illustrating a structure of a hub 210 of the related art. The hub 210 is located at the longitudinal center C of the exhaust diffuser 106, and the diameter thereof is substantially constant. In contrast, the diameter of the conical casing 220 gradually increases in the downstream direction. Thus, at a distal end at which the hub 210 terminates, there is a sudden expansion in a flow space. Due to this sudden expansion of the flow space, a sudden change in pressure occurs in a flow of combustion gas, resulting in a loss. A portion of the flow drawn into the end of the hub 210 is not properly coupled, so that a long flow separation section is formed at the rear of the hub 210.

Figure 6:
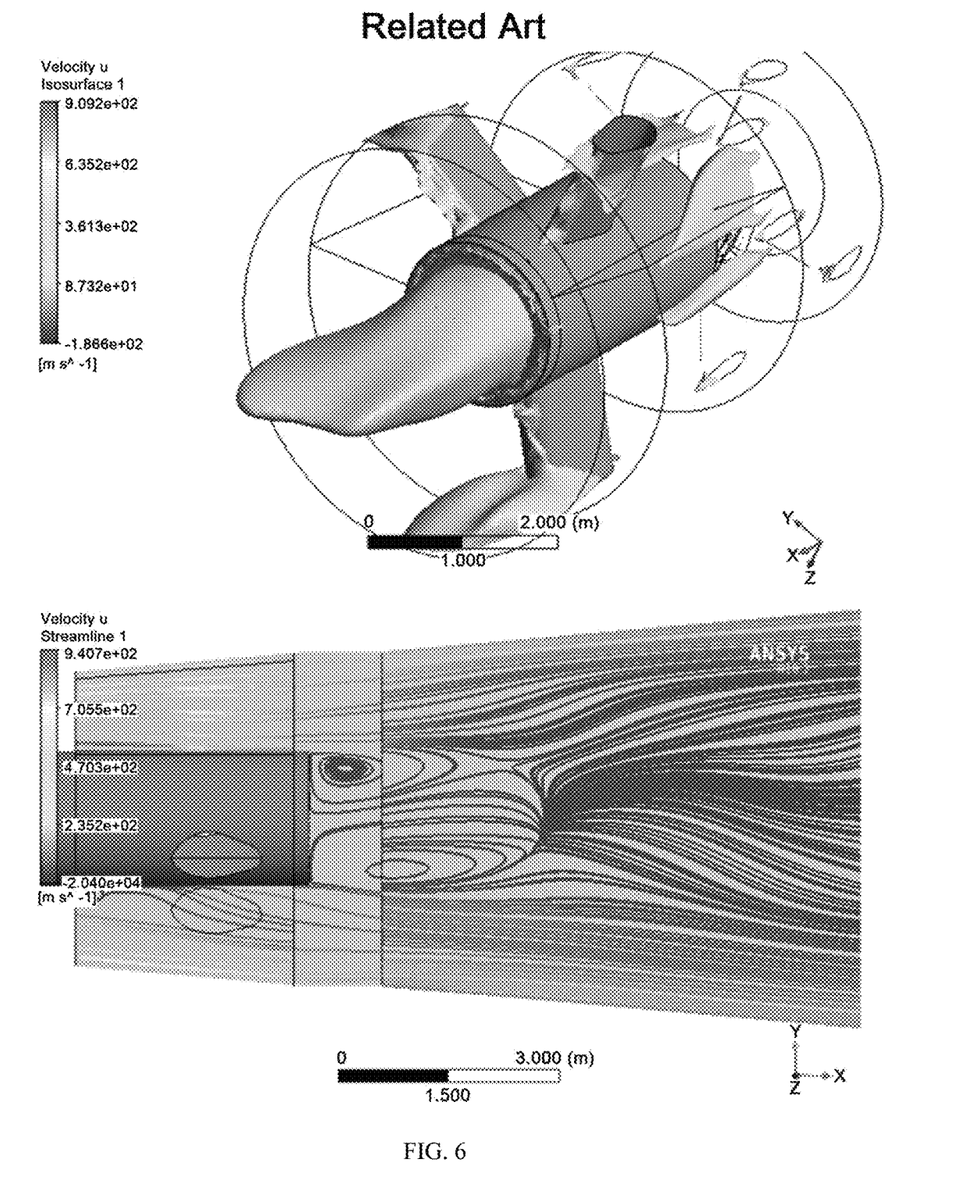
FIG. 6 is a view illustrating a result of computational analysis performed on a flow of combustion gas passing along the hub illustrated in FIG. 3.

FIG. 6 is a view illustrating a result of computational analysis performed on a flow of combustion gas moving along the related-art hub 210 of FIG. 3. Referring to FIG. 6, a long flow separation section in which two flow branches rounded toward the hub 210 are separated extends through a sudden expansion section at the rear of the hub 210. Such a sudden expansion and the occurrence of flow separation in the sudden expansion section degrade the efficiency of exhaust of the exhaust diffuser 106.

Figure 4:
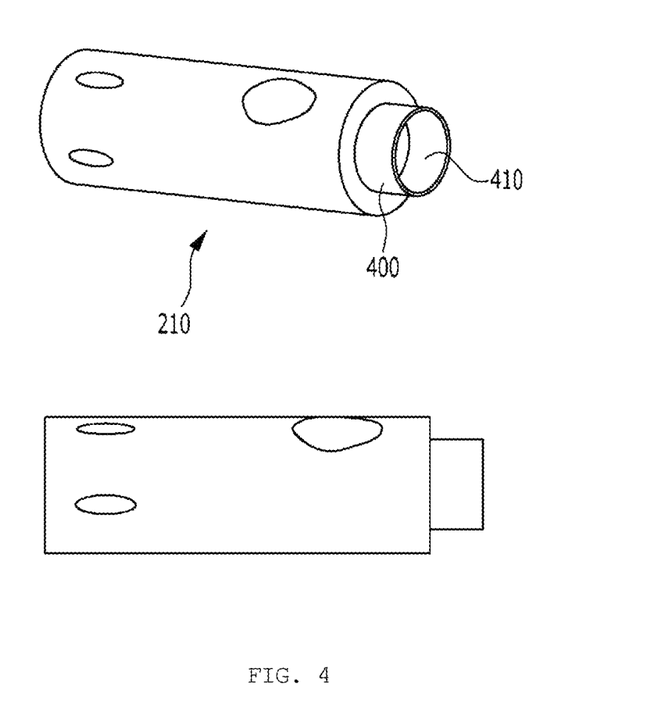
FIG. 4 is a view illustrating a hub according to an exemplary embodiment.

FIG. 4 is a view illustrating a hub according to an exemplary embodiment. Referring to FIG. 4, a hub 210 according to the exemplary embodiment includes a hub extension 400 extending from a downstream end of the hub 210 in the longitudinal direction. A cross-sectional area (i.e., a cross-sectional area perpendicular to the longitudinal direction) of the hub extension 400 is smaller than a cross-sectional area of the hub 210. The hub extension 400 provided on the longitudinal distal end of the hub 210 in this way results in a reduction in the sudden expansion section by a space occupied by the hub extension 400.

In other words, the sudden expansion section downstream of the hub 210 does not expand suddenly at once. Rather, the sudden expansion section has an expansion pattern of two stages of expansion, that is, a first expansion stage in an area in which the hub extension 400 is located and a second expansion stage occurring after the first expansion stage. That is, the hub extension 400 according to the exemplary embodiment reduces a sudden change in pressure downstream of the hub 210, thereby having an effect of reducing pressure loss.

The hub extension 400 may be implemented with various types of attachments configured to reduce the sudden expansion section. For the symmetry of flow, the hub extension 400 may be configured to be concentric with the hub 210 and to form a stepped portion with respect to the hub 210. The stepped portion extends along the circumference of hub extension 400. Further, because the hub 210 is cylindrical, the hub extension 400 may also have a cylindrical structure concentric with the hub 210.

In addition, the cylindrical hub extension 400 may have a hollow cylindrical structure in which one end is exposed. In other words, the hub extension 400 has a cylindrical shape in which an open cavity 410 is formed therein. The inner space of the hub extension 400 communicates with the outside, and the combustion gas flows to the surface of the hub extension 400, so that a portion of the combustion gas is introduced to temporarily stay in the inner space of the hub extension 400, thereby having an effect of reducing the occurrence of flow separation.

Figure 5:
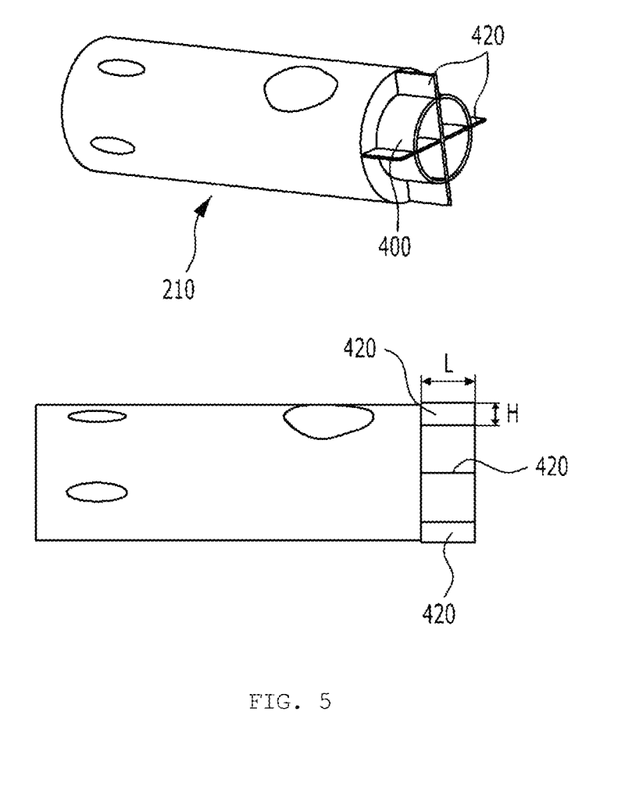
FIG. 5 is a view illustrating a hub according to another exemplary embodiment.

FIG. 5 is a view illustrating a hub according to another exemplary embodiment. Referring to FIG. 5, one or more guides 420 are attached to side surface portions of the hollow cylindrical hub extension 400 of FIG. 4. The guides 420 serve to block and distribute a flow of the combustion gas directed to the hub extension 400. That is, the guides 420 serve to temporarily distribute a flow separation section occurring in the sudden expansion section and divide into a plurality of flows, thereby reducing a size of the flow separation.

The guides 420 may be triangular, trapezoidal, or the like. In order to sufficiently distribute the flow separation at an entrance of the sudden expansion section, each of the guides 420 provided around the hub extension 400 may have a quadrangular shape. The guide 420 has a height H corresponding to a height of the stepped portion formed by the hub extension 400 with respect to the hub 210 and a length L corresponding to a length of the hub extension 400.

A plurality of guides 420 may be provided around the hub extension 400 to sufficiently distribute the flow separation. Here, angles between the guides 420 may be set to be equal to produce a flow characteristic that is as uniform as possible. In FIG. 5, four guides 420 are arranged at equal angles of 90°.

In addition, the plurality of guides 420 may extend into the hub extension 400 and intersect each other. The plurality of guides 420 extending into the hub extension 400 may sufficiently inflow the combustion gas into the inner space of the hub extension 400, thereby further reducing the occurrence of flow separation.

Figure 7:
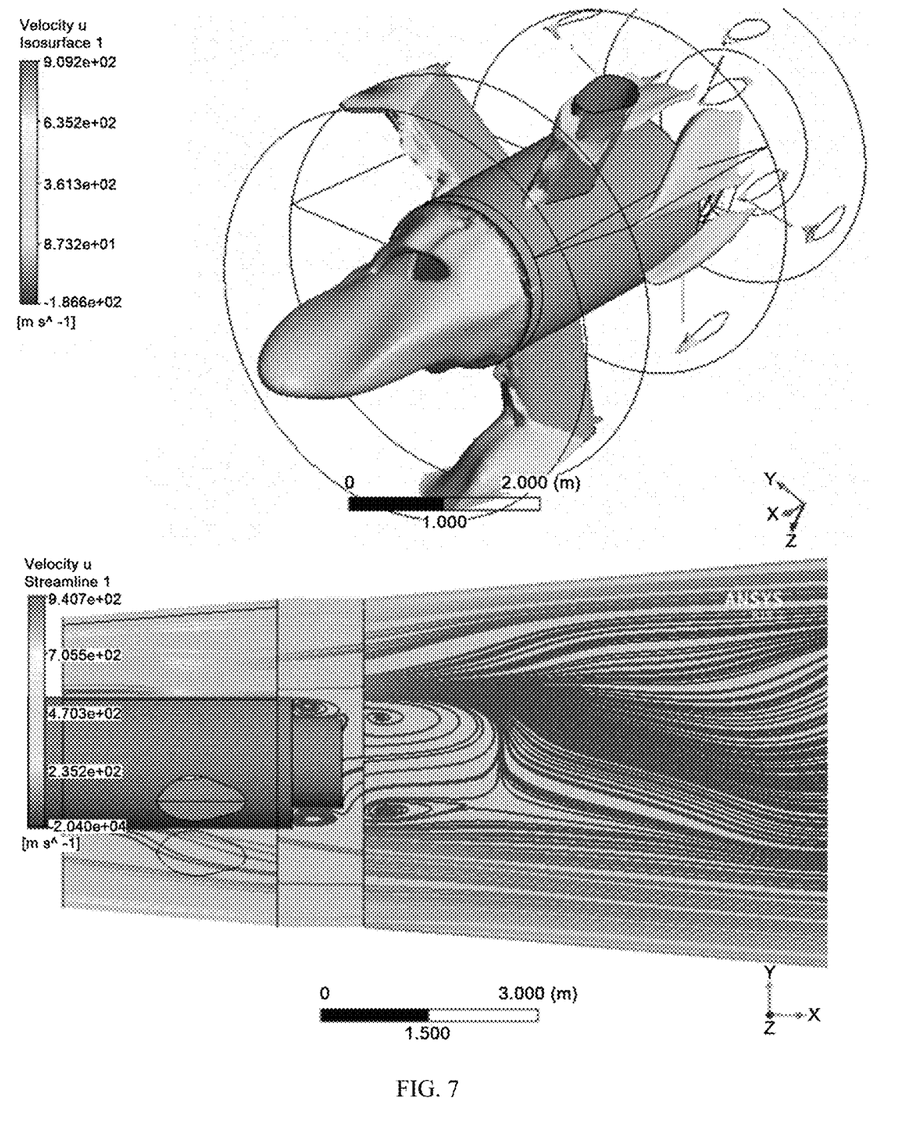
FIG. 7 is a view illustrating a result of computational analysis performed on a flow of combustion gas passing along the hub illustrated in FIG. 4.
Figure 8:
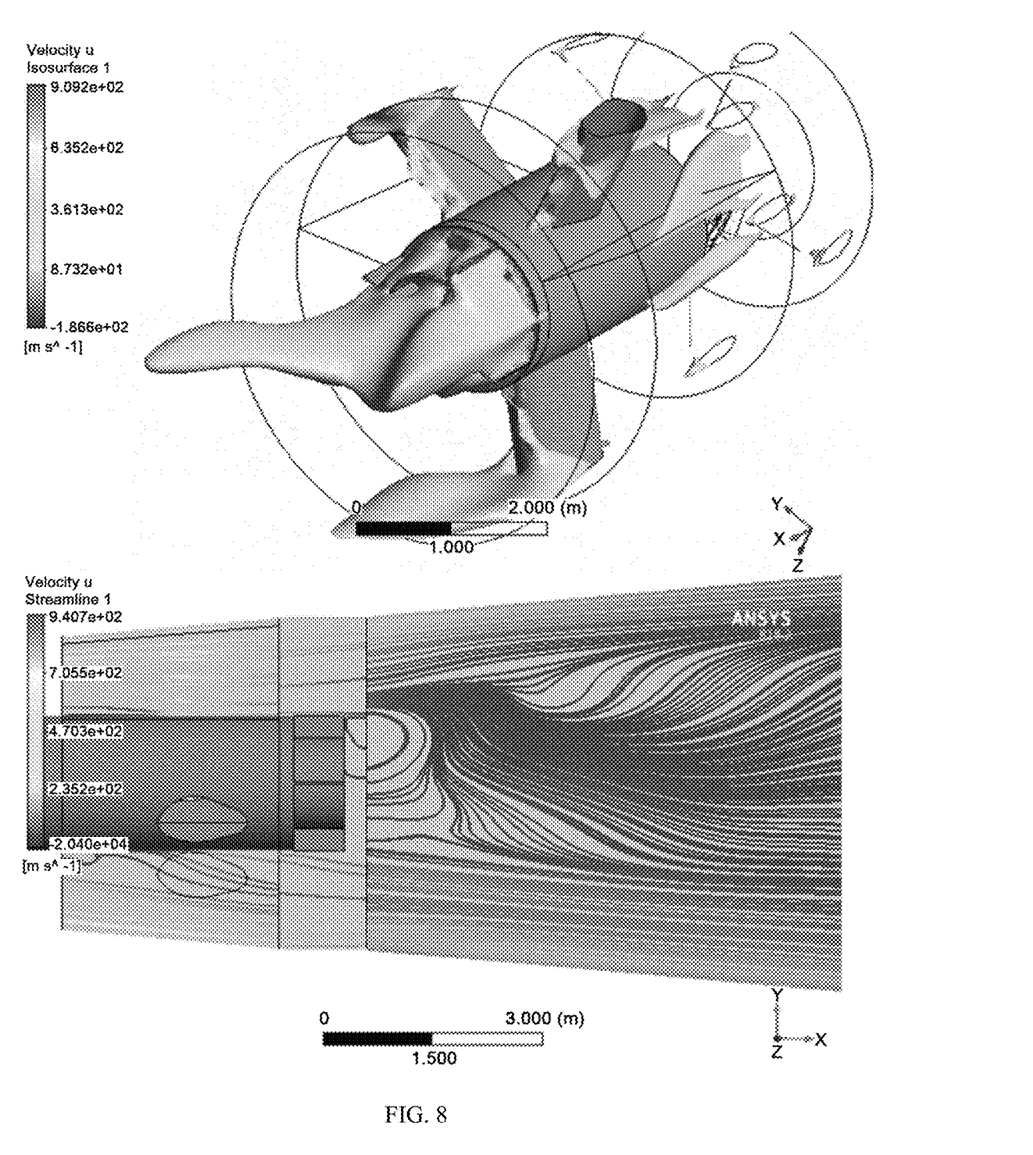
FIG. 8 is a view illustrating a result of computational analysis performed on a flow of combustion gas passing along the hub illustrated in FIG. 5.

FIG. 7 is a view illustrating a result of computational analysis performed on a flow of combustion gas passing along the hub 210 illustrated in FIG. 4, and FIG. 8 is a view illustrating a result of computational analysis performed on a flow of combustion gas passing along the hub 210 illustrated in FIG. 5, i.e., the hub 210 including the guides 420. Comparing FIGS. 7 and 8 to FIG. 6, it is apparent that the occurrence of flow separation is significantly reduced due to the hub extension 400 provided on the hub 210 of the exhaust diffuser 106. Although localized portions of flow separation sections may have similar lengths, the flow separation shown in FIGS. 7 and 8 is clearly reduced than the flow separation shown in FIG. 6 at an overall level.

Table 1 below compares the flow performance of the related-art hub 210 illustrated in FIG. 3 and the flow performance of the hubs 210 according to the exemplary embodiments illustrated in FIGS. 4 and 5.

TABLE 1

|  | FIG. 3 | FIG. 4 | FIG. 5 |
|---|---|---|---|
| Cp | 0.839 | 0.843 | 0.846 |
| Press. Loss | 2.19 | 2.16 | 2.15 |

In Table 1, Cp is a dimensionless coefficient of pressure recovery (i.e., a ratio of dynamic pressure to static pressure). The faster the pressure recovery, i.e., the higher the Cp value, the more advantageous the exhaust efficiency. Pressure loss refers to a pressure drop in combustion gas occurring in the sudden expansion section. The lower the pressure loss, the higher the exhaust efficiency of exhaust.

Referring to Table 1, it is apparent that the pressure recovery and the pressure loss of the two exemplary embodiments are improved over those of the related-art hub 210. That is, on a quantitative basis, the hub 210 of the hub extension 400 according to the exemplary embodiments reliably reduces the occurrence of flow separation and achieves significant improvement in both the pressure recovery and the pressure loss compared to the related-art hub 210.

As described above, one or more exemplary embodiments provide the exhaust diffuser 106 capable of reducing a sudden area change and flow separation occurring in the sudden expansion section of the hub 210. In this regard, in the exhaust diffuser 106 including the cylindrical hub 210, the conical casing 220 disposed outside and concentrically with the cylindrical hub 210, and the strut 300 connecting and supporting the hub 210 and the casing 220, the hub extension 400 extends from the downstream end of the hub 210 in the longitudinal direction of the exhaust diffuser 106 and has a transverse cross-sectional area smaller than the transverse cross-sectional area of the hub 210.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. An exhaust diffuser hub disposed at a longitudinal center of an exhaust diffuser, the hub comprising:
a hub extension extending from a downstream end thereof in a longitudinal direction of the exhaust diffuser; and
at least one guide provided on side surface portions of the hub extension,
wherein a transverse cross-sectional area of the hub extension is smaller than a transverse cross-sectional area of the hub,
wherein the hub extension is concentric with the hub and forms a stepped portion with respect to the hub, and
wherein a radially outward end of the at least one guide corresponds to a radially outward end of the stepped portion formed by the hub extension with respect to the hub, the radially outward end of the at least one guide terminating in a free end.

2. The exhaust diffuser hub of claim 1, wherein the cylindrical hub extension is hollow and one end thereof is exposed.

3. The exhaust diffuser hub of claim 1, wherein a length of the at least one guide corresponds to a length of the hub extension.

4. The exhaust diffuser hub of claim 3, wherein the at least one guide has a quadrangular shape.

5. The exhaust diffuser hub of claim 3, wherein the at least one guide comprises a plurality of guides, and angles between the plurality of guides are equal.

6. The exhaust diffuser hub of claim 3, wherein the at least one guide comprises a plurality of guides extending into the hub extension and intersecting with each other.

7. The exhaust diffuser hub of claim 1, wherein the stepped portion extending along a circumference of the hub extension.

8. The exhaust diffuser hub of 7, wherein the hub extension is cylindrical.

9. An exhaust diffuser comprising:
a cylindrical hub;
a conical casing disposed outside and concentric with the cylindrical hub; and
a strut configured to connect and support the cylindrical hub and the conical casing,
wherein the hub comprises a hub extension extending from a downstream end thereof in a longitudinal direction of the exhaust diffuser, and at least one guide provided on side surface portions of the hub extension,
wherein a transverse cross-sectional area of the hub extension is smaller than a transverse cross-sectional area of the hub,
wherein the hub extension is concentric with the hub and forms a stepped portion with respect to the hub, and
wherein a radially outward end of the at least one guide corresponds to a radially outward end of the stepped portion formed by the hub extension with respect to the hub, the radially outward end of the at least one guide terminating in a free end.

10. The exhaust diffuser of claim 9, wherein the stepped portion extending along a circumference of the hub extension.

11. The exhaust diffuser of claim 10, wherein the hub extension is cylindrical.

12. The exhaust diffuser of claim 11, wherein the cylindrical hub extension is hollow and one end thereof is exposed.

13. The exhaust diffuser of claim 9, wherein a length of the at least one guide corresponds to a length of the hub extension.

14. The exhaust diffuser of claim 13, wherein the at least one guide has a quadrangular shape.

15. The exhaust diffuser of claim 13, wherein the at least one guide comprises a plurality of guides, and angles between the plurality of guides are equal.

16. The exhaust diffuser of claim 13, wherein the at least one guide comprises a plurality of guides extending into the hub extension and intersecting with each other.

* * * * *